(12) United States Patent
Pöppinghaus

(10) Patent No.: US 6,360,982 B1
(45) Date of Patent: Mar. 26, 2002

(54) METHOD AND DEVICE FOR CORRECTING THE BENDING OF A SHAFT, AN AXLE OR ANOTHER CARRIER

(76) Inventor: Winfried Pöppinghaus, Leipziger Str. 16, D-37242 Bad Sooden-Allendorf (DE)

( * ) Notice: Subject to any disclaimer, the term of this patent is extended or adjusted under 35 U.S.C. 154(b) by 0 days.

(21) Appl. No.: 09/254,340
(22) PCT Filed: Aug. 16, 1997
(86) PCT No.: PCT/EP97/04472
§ 371 Date: Mar. 5, 1999
§ 102(e) Date: Mar. 5, 1999
(87) PCT Pub. No.: WO98/10199
PCT Pub. Date: Mar. 12, 1998

(30) Foreign Application Priority Data

Sep. 6, 1996 (DE) .......................... 196 36 184

(51) Int. Cl.⁷ .............................. B65H 18/08
(52) U.S. Cl. .............. 242/539; 242/598.5; 242/599.3; 242/914; 384/587; 492/6
(58) Field of Search .................... 242/539, 541, 242/598.5, 599.3, 914; 492/6, 7; 384/568, 587

(56) References Cited

U.S. PATENT DOCUMENTS 3,236,471 A * 2/1966 Hornbostel ............... 242/541
4,732,345 A * 3/1988 Golden .................. 242/599.3

FOREIGN PATENT DOCUMENTS

| DE | 1 610 886 | 8/1966 |
| DE | 44 39 908 | 11/1994 |
| EP | 0 686 502 A3 | 11/1996 |
| FR | 1450291 | 10/1965 |

OTHER PUBLICATIONS

European Search Report.

* cited by examiner

Primary Examiner—John Q. Nguyen
(74) Attorney, Agent, or Firm—Thomas, Kayden, Horstemeyer & Risley

(57) ABSTRACT

The invention relates to a method and a device for correcting the bending of a shaft (2), an axle or another carrier resting with both ends upon a pair of bearing elements (6, 7). The carrier bends under its own weight and/or additional loading and/or due to forces applied on the bearing elements. Said bearing elements are submitted to a bending counterforce (4) produced using the carrier weight and/or additional loading and/or forces applied.

2 Claims, 4 Drawing Sheets

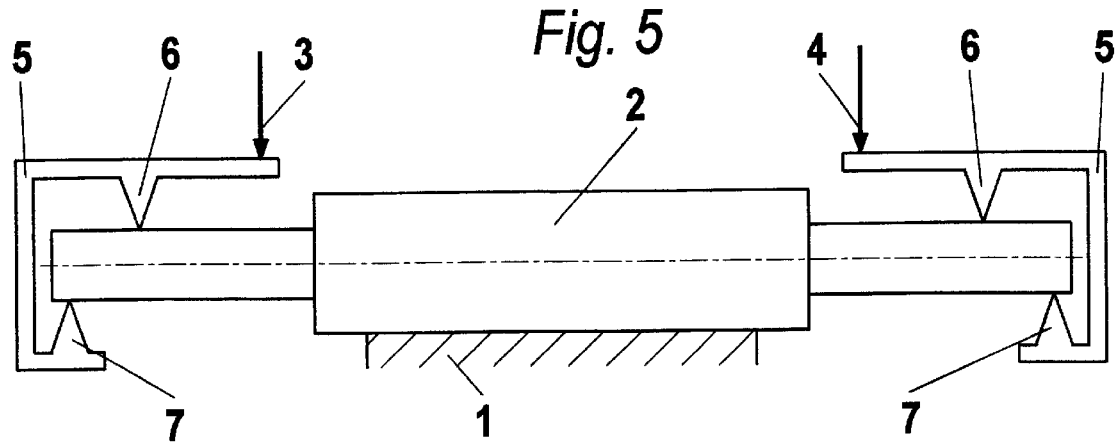
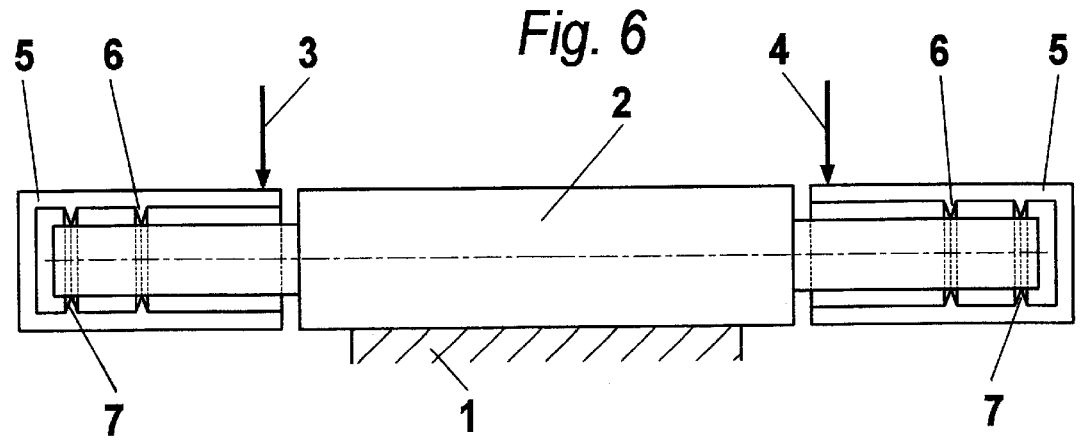
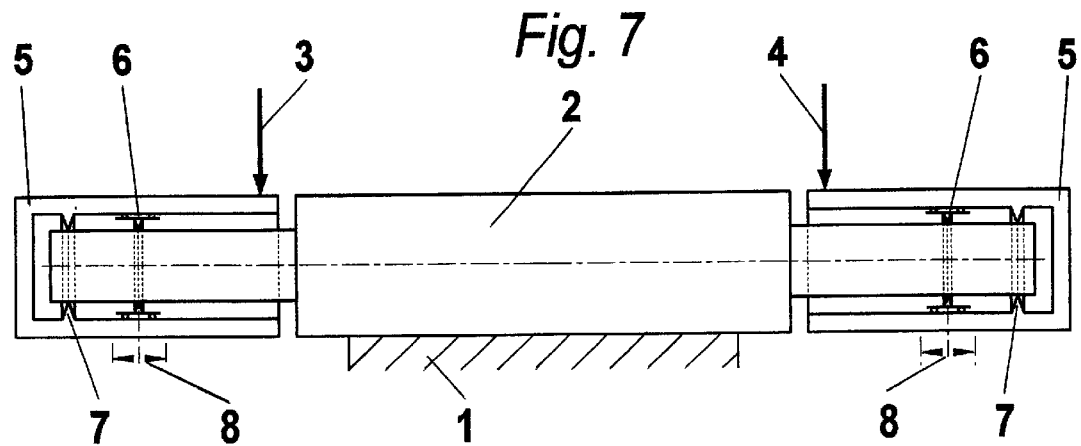

METHOD AND DEVICE FOR CORRECTING THE BENDING OF A SHAFT, AN AXLE OR ANOTHER CARRIER

FIELD OF THE INVENTION

The present invention generally relates to a method for correcting the bending of a carrier, a shaft or an axle.

The carrier in the region of each of its two ends is supported by a pair of supporting elements. Each pair of supporting elements is formed by two supporting elements. The carrier is bent due to its weight and possibly due to additional loads and/or to loading forces being applied onto the supporting elements. A counter bending force counteracting the bending is introduced into the supporting elements. Additionally, an apparatus being suitable for conducting the method is disclosed.

The invention can be applied in all cases in which a carrier is submitted to bending, and in which bending is undesired and has a negative effect. The changing or correcting of the bending or deflection of a carrier is described, i.e., a manner how to counteract bending in the sense of a controlled process. The carriers may have very different designs. The carriers may be non-moving beams. Nevertheless, it is preferred to apply the invention to rotatingly driven or rotating carriers, especially shafts with which a torque is transmitted, and axles serving to hold transverse forces. Preferred fields of application of the invention are warm and cold rolling mills, sheet metal bending machines, paper machines, reel slitting machines, calenders and similar devices. It is also possible to use the present invention in case of applying paste-like masses onto plane carrier material, which is carried out by means of rollers.

BACKGROUND OF THE INVENTION

A method and an apparatus are known from the German Patent Application number DE 44 39 908 A1. A winding shaft being supported on supporting elements is used as a carrier. The plane material is winded around the carrier to form a wind lap. When the diameter of the wind lap increases, the additional load of the wind lap and the weight of the shaft cause in a deflection of the winding shaft, so that not only the winding shaft, but also the wind lap is bent. The winding shaft in the region of its two ends is supported by a pair of supporting elements. Each pair of supporting elements includes two supporting elements. Both supporting elements of the pair of supporting elements can be formed as bearings. The two bearings of one side are supported with respect to one another by a frame. A compensation device in form of a working cylinder is arranged inside the frame. Thus, the frame is designed to be moveable. The working cylinder contacts one of the two bearings, and it applies a controlling force onto the supporting element it engages. Consequently, at the other bearing a corresponding reaction force results. Both forces produce a counter bending moment which counteracts the bending of the winding shaft. A control device including a computer unit, a control line and a control element is provided to control the controlling force acting upon the winding shaft by the working cylinder. This arrangement provides a compensation device. The compensation device has a rather complicated structure, and it requires the arrangement of a special power source acting upon the working cylinder. Depending on the design of the control device and of its way of operating, the bending effect resulting form the additional load of the wind lap and/or by the loading force onto the winding shaft can be at least partially compensated by the counter bending forces being applied at the end of the shafts.

To counteract the disadvantages of the bending of shafts, it is further known to emboss the rollers. The rollers are designed in an embossed fashion, the diameter of the rollers being chosen to have twice the amount in the region of the middle of the roller than it corresponds to the bending of the roller during operation. This arrangement has a positive effect, but it requires that the rollers are exclusively operated in a small working region, in which neither the pressing forces nor the characteristics of the material to be treated substantially change. On the other hand, in case of different working conditions, it is known to produce special embossed rollers for each working condition, and to replace the rollers. This method is rather expensive since it is difficult to produce exact embosses and due to the necessary retool times.

Hydrostatic bearings are explained and described in the magazine Fluid, June 1978, pages 31–37, "Hydrostatische Lagerung in Papiermaschinen", Volz/Voetsch. The hydrostatic bearings spaced apart in the direction of the axis of the shaft. Thus, hydraulic single supporting elements are shown and described. The single supporting elements are individually impinged to provide counter forces in certain sections of heavy rollers, especially in paper machines. The structural and the controlling expenditure of such a hydraulic bearing including a plurality of supporting points is great.

It is therefore an object of the present invention to provide a method for correcting the bending of a shaft, an axle or another carrier, i.e. to provide the possibility of a counteracting control, that counteracts the bending of the shaft, the axle or the other carrier without the requirement of a complicated control device.

It is another object of the present invention to provide an apparatus suitable for conducting the method. The apparatus has an advantageously simple structure, and it is therefore inexpensive to use in different fields of application.

SUMMARY OF THE INVENTION

According to the present invention, this is achieved in a method for corrections the bending of a carrier by the counter bending force being derived from the weight of the carrier and possibly of the additional loads and/or the loading forces being introduced directly into the supporting elements.

The invention is based on the idea not to introduce a separately produced control force as counter bending force, but instead a counter bending force being derived from the weight and/or the loads and/or the loading forces causing the bending of the carrier. In this way, a counter bending moment is applied which acts in a direction opposite to the bending of the carrier. The named forces are directly used as counter bending forces. The counter bending force is formed by the sum of the forces causing the bending. In this way, the advantageous effect is achieved that, due to a change of the loads and/or the loading forces, the corresponding counter bending force also changes, and it adapts automatically, so that a complicated control device is not required. The force being introduced as counter bending force can be also changed to consciously compensate the bending only partially, or to overcompensate the bending. The counter bending force is directly derived from the corresponding load of the carrier. A separate power source and separate force transmitter are not required. Since the value of the counter bending force depends directly proportionally form the loads and/or loading forces directly or indirectly loading the carrier, controlling is not necessary to eliminate bending of the carrier in case of different loads and/or loading forces.

This is also true for non-symmetric loads and/or loading forces, i.e. in case of forces differently acting on the different sides of the carrier.

The loading force may be introduced into both supporting elements with a distance to the supporting elements of each pair of supporting elements. By this axial distance, the ratio is advantageously used. Not only a loading force is applied, but at the same time, a counter bending moment. The counter bending forces result from the relative distances between their places of application of the forces with respect to one another and from the loading force.

The apparatus for conducting the method includes a rigid frame being arranged in the region of each end of the carrier. Each rigid frame includes a pair of supporting elements and a place of application for the introduction of the loading forces and, respectively, a place of application to bear up the counter bending force resulting from the weight and possibly from the additional loads and/or the loading forces into the supporting elements. The rigid frame is an essential structural element of the apparatus. In any case, the rigid frame is arranged in the region of each end of the carrier, and it is supported on the ends of the carrier. The frame is not additionally supported. It serves to introduce the loading force or to bear up the overall force consisting of the weight of the carrier, a possible supporting load or any other loads. This arrangement ensures that an automatic adaptation in case of the overall force changing occurs.

The place of application for the introduction of the loading forces is axially spaced apart from the pair of supporting elements. Consequently, the loading force is turned into a counter bending force being directed in opposite direction to the bending of the carrier. The pair of supporting elements is designed as two spaced apart bearings to support the carrier being designed as a shaft or as an axle. This means, that both bearings support the shaft or the axle, and on the other hand, they are supported in the rigid frame being exclusively loaded by the loading forces.

The axial distance between the two supporting elements or bearings of each pair of supporting elements may be adjustable. Such a design makes sense to apply, for example, small loading forces, and to nevertheless produce a sufficient counter bending moment being sufficient to eliminate the bending of the shaft due to the ratio. In this case, one of the supporting elements or bearings of each pair of supporting elements is designed as a fixed bearing, and the other supporting element or bearing is designed as a movable bearing. It is desirable to locate the moveable bearing between the fixed bearing and the place of application for the introduction of the loading force.

It is also possible that the place of application for the introduction of the loading force on the frame is axially adjustable. In this way, the value of the counter bending forces and of the counter bending moments, respectively, can be changed in a simple manor. The place of application for the introduction of the loading force on the frame may be also designed as a bearing. The design as a bearing has the advantage that the direction of the loading force can be changed, and in this way an automatic adaptation by applying the counter bending moments occurs. Such a case occurs, for example, when two rollers are pressed against one another, the axes of the rollers being arranged horizontally adjacent. The direction of the loading force can also change during the operation of the apparatus. An automatic adaptation also occurs in this case.

Mechanical, electrical or fluid actuated means may be provided for the adjustment of the bearings. Especially, hydraulic or pneumatic cylinders may be arranged as such means. These means are exclusively provided to adjust the bearings, and not to adjust the general application of the loading force.

BRIEF DESCRIPTION OF THE DRAWING

Other objects, features and advantages of the present invention will become apparent to those skilled in the art upon review of the following specification, when taken in conjunction with the accompanying drawings.

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

The invention is further explained and described with respect to preferred embodiments.

Figure 1:
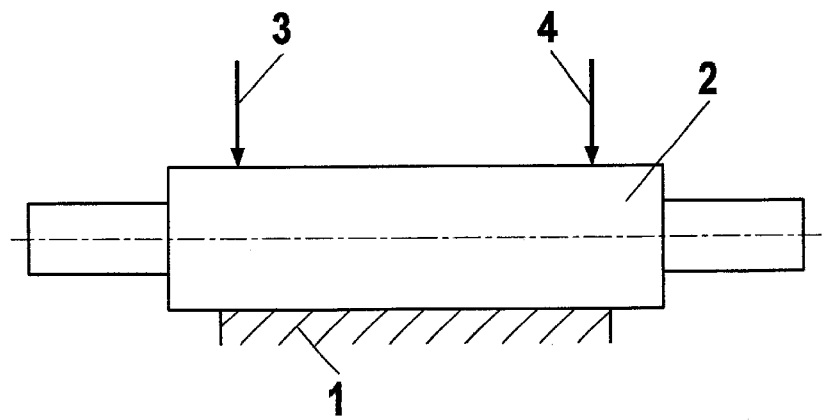

FIG. 1 illustrates the general loading situation of a carrier being supported on a rigid base including loading forces.

Figure 2:
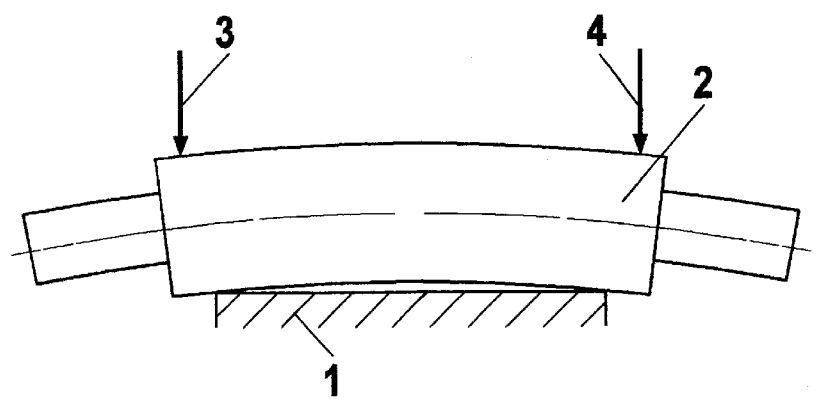

FIG. 2 illustrates the starting position according to FIG. 1 in an exaggerated manner. The loading forces are applied in a region outside the rigid base.

Figure 3:
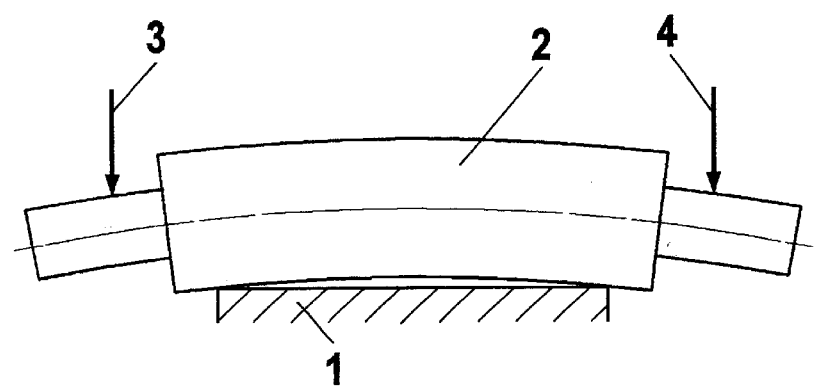

FIG. 3 illustrates a starting position in which the loading forces are applied even further outside.

Figure 4:
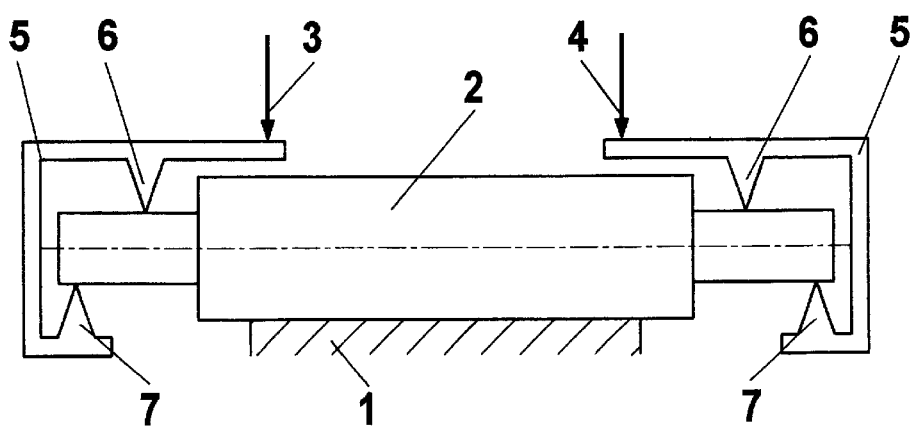

FIG. 4 illustrates the basic structure of the apparatus in a first embodiment.

FIG. 5 illustrates another basic structure of the apparatus.

FIG. 6 illustrates a more detailed embodiment of the apparatus.

FIG. 7 illustrates another embodiment of the apparatus having an adjustable bearing.

Figure 8:
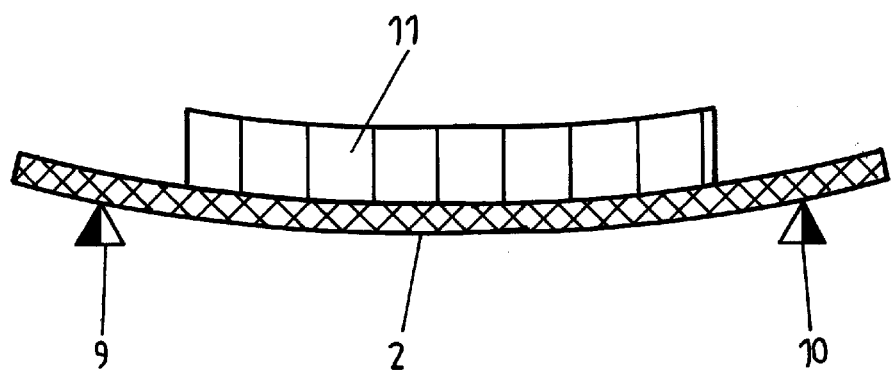

FIG. 8 illustrates the general starting position in case of a carrier under a line load being supported on two supporting elements.

Figure 9:
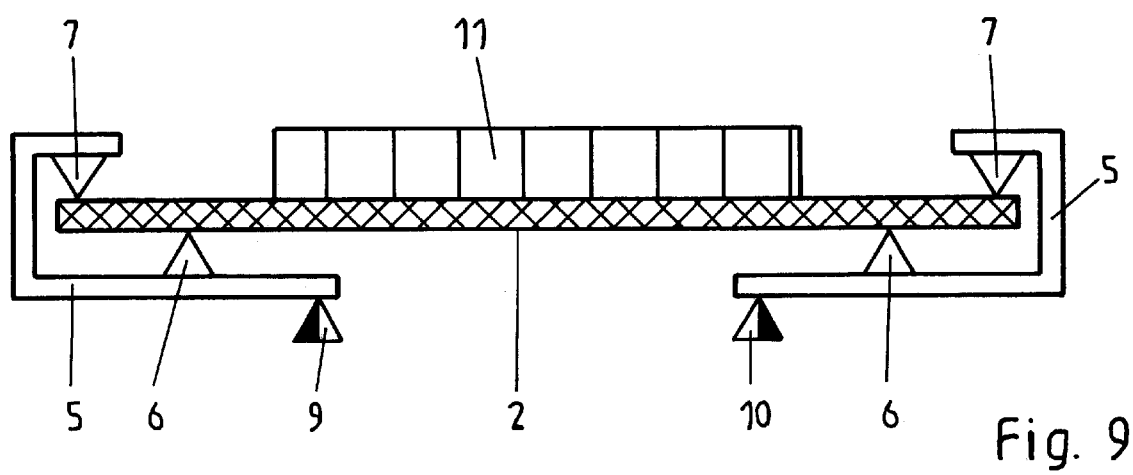

FIG. 9 illustrates the application of the invention in case of such a loading situation.

Figure 10:
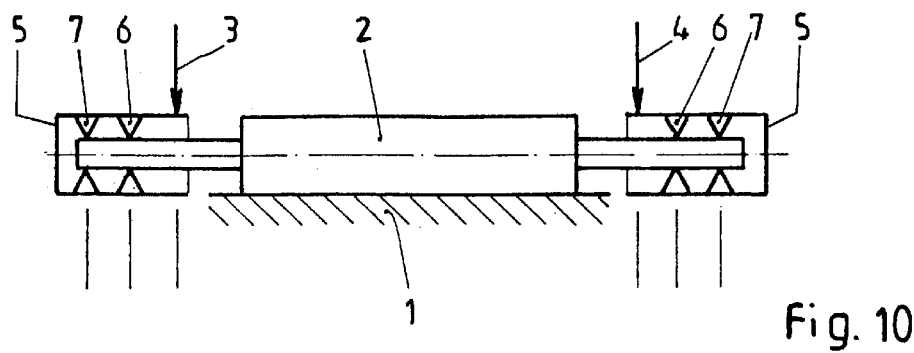

FIG. 10 illustrates a basic structure similar to FIG. 6.

Figure 11:
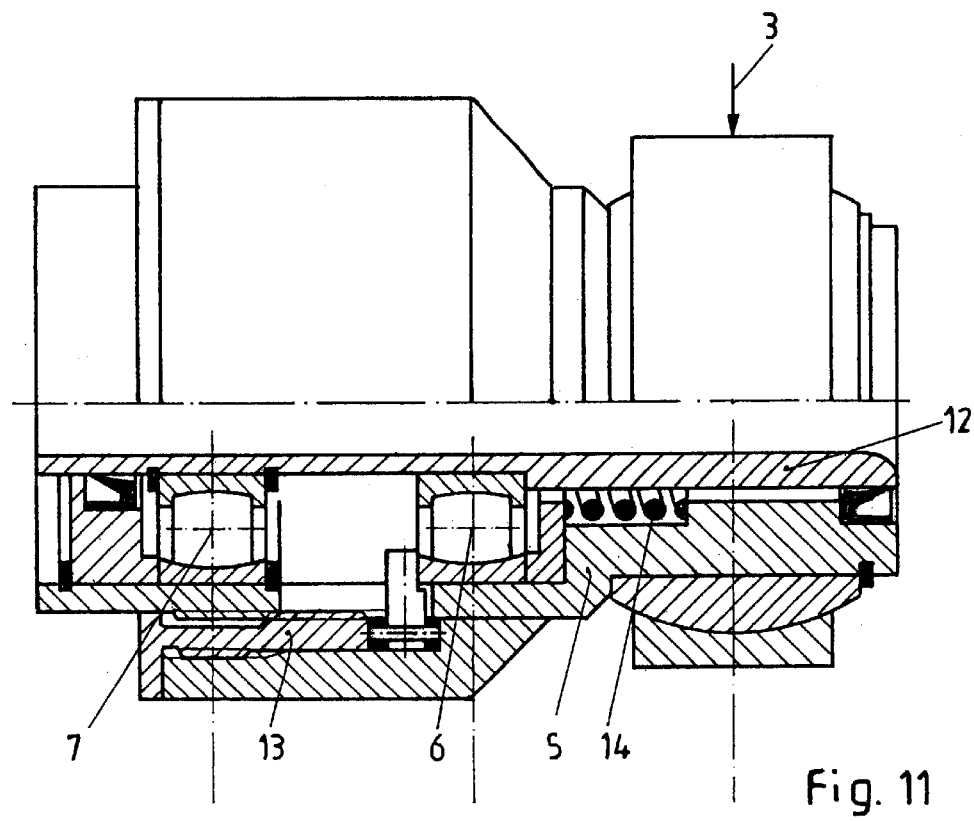

FIG. 11 illustrates a structure of one embodiment of one side of a shaft or an axle in the region of the support.

Figure 12:
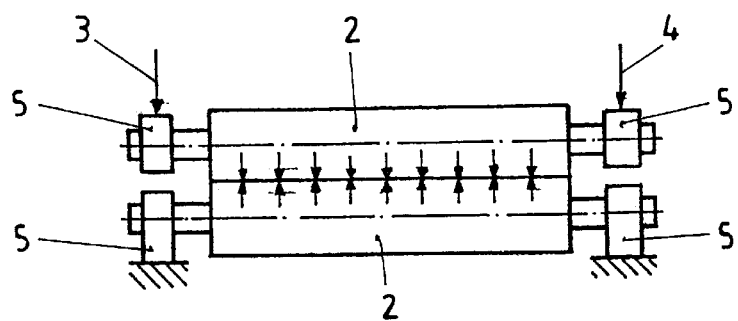

FIG. 12 illustrates the double application of the invention for a pair of rollers in a role mill.

DETAILED DESCRIPTION

FIG. 1 illustrates a rigid base 1 on which a carrier 2 in form of a roller is supported with its own weight. The carrier 2 is pressed against the rigid base 1 by loading forces 3 and 4 which are additional to its weight. Since the loading forces 3 and 4 are applied onto the carrier 2 inside the region being formed by the rigid base 1, the line pressure between the rigid base 1 and the carrier 2 is constant over the entire region. In this case, there is no such problem as a deflection or bending of the carrier 2.

FIG. 2 illustrates a similar situation as FIG. 1, but the loading forces 3 and 4 are applied onto the carrier 2 outside the region being formed be the rigid base 1. Consequently, the carrier 2 bends or deflects upwardly. The deflection increases when the loading forces 3 and 4 are applied further outside of the rigid base 1, as it can be seen from FIG. 3.

FIG. 4 illustrates the application and the force effects with the method according to the invention on principal. An arrangement as already described by reference to FIGS. 2 and 3 is illustrated. As an essential element, a rigid frame 5 is arranged on each side of the carrier 2. Each rigid frame 5 is supported on one side of the carrier 2, and it is connected thereto. The rigid frame 5 includes two supporting elements 6 and 7 forming a pair of supporting elements (on each side of the carrier 2). The rigid frames 5 are exclusively supported on the carrier 2. They are not supported on any other element. The loading forces 3 and 4 are applied onto the rigid frames 5, as illustrated. Thereby, the loading forces 3 and 4 are applied axially spaced apart from the supporting elements 6 and 7. Each loading force 3 and 4, respectively, results in reaction forces at the supporting elements 6 and 7. The reaction forces produce or generate a counter deflection moment in such a direction, that there is a counter action to the deflection of the shaft. According to FIG. 4, the deflection of the shaft is completely compensated. This is still true when the value of the loading force changes, or when the loading force 3 on the one side is more or less than the loading force 4 on the other side. In case of the loading forces 3 and 4 changing, an automatic control takes place, so that the undesired deflection of the carrier 2 is eliminated. As is results from a comparison of FIGS. 4 and 5, the desired effect is attained not matter if the loading forces 3 and 4 are applied onto the corresponding frame 5 inside the rigid base 1, or outside of the rigid base 1.

FIG. 6 illustrates a more constructive embodiment of the apparatus. Each rigid frame 5 forms a housing covering the end of the carrier 2 on each side in form of a shaft. The supporting elements 6 and 7 are designed as bearings. Thus, they are able to apply forces in any direction perpendicular to the axes of the carrier 2, so that the loading forces 3 and 4 may be directed differently. The effect lines of the loading forces 3 and 4 depend on the case of application.

FIG. 7 illustrates a more detailed design of the apparatus according to FIG. 6. The supporting element 6 can be moved and adjusted in the direction of double arrow 8. This is the direction of the axis of the carrier 2. Thus, the axial distance between the supporting elements 6 and 7 and the distance to the place of application of the introduction of the loading forces 3 and 4, respectively, changes. Thereby, the distribution of the value of the loading forces 3 and 4 onto the corresponding supporting elements 6 and 7 changes. The overall effect, meaning the linear or non-linear line pressure onto the base 1, remains constant. No additional forces are required to change the deflection of the carrier 2.

FIG. 8 illustrates a non-rotating carrier 2 being supported on two supporting elements 9 and 10. The carrier 2 carries a line load 11, so that without applying the invention, as it is illustrated in FIG. 8, a deflection results.

FIG. 9 illustrates the application of the invention for such a non-rotating carrier 2 having a line load 11. The two fixed frames 5 are arranged on each side of the carrier 2. Each rigid frame 5 includes two supporting elements 6 and 7 being connected to the carrier 2 at the ends thereof. Each frame 5 is supported on the supporting element 9 and 10, respectively, so that the supporting forces are transmitted from the loading forces onto the frames 5 in the region of these frames 9 and 10, respectively. These supporting forces as loading forces result directly from the weight of the carrier 2 and from the line load 11.

FIG. 10 illustrates another embodiment of the apparatus according to FIG. 6 on principal. The loading forces 3 and 4 are applied onto the frame 5 axially spaced apart to the supporting elements 6 and 7.

FIG. 11 illustrates a constructive embodiment of the left end of the apparatus according to FIGS. 6 and 10. The loading force 3 is applied onto the frame 5 at the illustrated point. The supporting element 6 is designed as a moveable bearing, while the supporting element 7 is formed as a fixed bearing. The frame 5 includes a bush 12. The bush 12 can slight onto the end of a shaft-like carrier 2 (not illustrated). The bearings (our supporting elements 6 and 7) are designed as spherical roller bearings. The relative axial position of the supporting element 6 with respect to the supporting elements 7 and to the place of application for the introduction of the loading force 3 can be changed by an adjustment ring 13 acting against the force of a spring 14. The supporting elements 6 and 7 can be sealed as bearings in the illustrated manner.

FIG. 12, one more time, illustrates the double application of the invention on principal in case of two carriers 2 being formed as rollers. In each end region of each carrier 2, bearing elements are arranged, as it is illustrated in FIG. 11. The entire arrangement is supported on the ground. The loading forces 3 and 4 are applied via the upper bearing elements. Forces having the same value are applied onto the lower carrier 2 as counter forces. Consequently, the deflection of the carrier 2 is eliminated.

While the foregoing specification and accompanying drawings disclose a preferred embodiment of the invention, it will be understood by those skilled in the art that variations and modifications can be made thereto without departing from the spirit and scope of the invention, as set forth in the following claims.

LIST OF REFERENCE NUMERALS

01—base
02—carrier
03—loading force
04—loading force
05—frame
06—supporting element
07—supporting element
08—double arrow
09—supporting element
10—supporting element
11—line load
12—bush
13—adjustment ring
14—spring

What is claimed is:

1. An apparatus for correcting the deflection of an elongated rotating cylindrical carrier having opposed first and second ends, the cylindrical carrier being at least loaded by the weight of the cylindrical carrier, said apparatus comprising:

a first rigid frame being arranged for placement in the region of a first end of the cylindrical carrier, said first rigid frame including two first spaced apart bearings to support the cylindrical carrier;

a second rigid frame being arranged for placement in the region of a second end of the cylindrical carrier, said second rigid frame including two second spaced apart bearings to support the cylindrical carrier;

a first place of application for the introduction of a first additional loading force into said first rigid frame, wherein said first place of application of said first additional loading force is axially offset from said two first bearings, and wherein said first place of application of said first additional loading force is axially displaced from between said two first bearings; and a second place of application for the introduction of a second additional loading force into said second rigid frame, wherein said second place of application of said second additional loading force is axially offset from said two second bearings, and wherein said second place of application of said second additional loading force is axially displaced from between said two second bearings.

2. An apparatus for applying loads to the ends of an elongated cylindrical carrier and opposing the bending of the carrier in response to the applied loads, the carrier having opposed ends and a longitudinal axis extending along the length of the carrier, said apparatus comprising:

a rigid frame for mounting about each end of said carrier, each said frame including first and second supporting elements for engaging the carrier from opposite directions about the axis of the carrier and at positions longitudinally offset from each other along the length of the carrier, with said first supporting element positioned at the end of the carrier and said second supporting element displaced from the end of the carrier, said rigid frames each further including means for applying a load to each rigid frame at a position displaced farther along the length of said carrier from the end of said carrier than said second supporting element, so that the load applied to each rigid frame tends to tilt the rigid frame on the carrier about said second supporting element so that said first supporting element tends to urge the end of the carrier in a direction opposite to the applied load.

* * * * *